3,088,908
Patented May 7, 1963

3,088,908
HYDROCRACKING PROCESS AND CATALYSTS
Rowland C. Hansford, Fullerton, Calif., assignor to Union
Oil Company of California, Los Angeles, Calif., a corporation of California
No Drawing. Filed May 11, 1961, Ser. No. 109,246
14 Claims. (Cl. 208—109)

This invention relates to the hydrocracking of high-boiling mineral oils to produce therefrom lower-boiling hydrocarbons, boiling for example in the gasoline range. The invention is more particularly directed toward the provision of new and novel catalysts for use in hydrocracking processes, and other acid-catalyzed reactions. Briefly, the essential novel element of the new catalysts of this invention is a highly acidic cracking base composed of a metal phosphate gel chemically compounded with silicon tetrafluoride. The finished catalyst also includes a conventional hydrogenating component such as a group VIII metal, which may be separately added to the cracking base as by impregnation, or may be chemically compounded therewith as metal phosphate. It has been found that silicon tetrafluoride added to such metal phosphate gel bases induces an unusually stable and highly acidic function in the catalyst. The catalysts of this invention possess the unusual property of catalyzing desired hydrocracking reactions at very low temperatures, e.g., 400° to 700° F.

It is known that the activity of various gel-type oxides, such as alumina, for promoting acid-catalyzed reactions such as isomerization and cracking can be improved by combining therewith a halogen function such as fluorine or silicon tetrafluoride. Xerogel structures, such as those of activated alumina, are generally thought of as being anhydrous, but actually they contain small amounts of water in the form of hydroxyl groups attached to the aluminum atoms; the removal of all such hydroxyl groups would destroy the gel structure. Thus, when activated alumina gel is reacted with silicon tetrafluoride, the following type of reaction is believed to occur:

$$>Al—OH + SiF_4 \rightarrow >Al—O—SiF_3 + HF$$

The hydrogen fluoride which is liberated in this reaction can then react with other hydroxyl groups as follows:

$$>Al—OH + HF \rightarrow >Al—F + H_2O$$

Thus, the fluorine which is introduced as $SiF_4$ can terminate in forms bonded directly to the aluminum, or to the silicon atoms. Both types of fluorine are believed to furnish desirable acidity on the catalyst. However, when water is present in feedstocks being treated over such materials, the following exemplary types of reactions can occur, which may result in the fluorine ultimately appearing as aluminum trifluoride:

$$>Al—O—SiF_3 + H_2O \rightarrow >Al—O—SiF_2OH + HF$$
$$>Al—O—SiF_2OH + H_2O \rightarrow >Al—O—SiF(OH)_2 + HF$$
$$AlF(OH)_2 + 2HF \rightarrow AlF_3 + 2H_2O$$

In addition, basic aluminum fluorides can disproportionate at high temperatures to yield aluminum trifluoride, e.g., as follows:

$$2AlF_2OH \rightarrow AlF_3 + AlF(OH)_2$$

At this point, it is important to note that aluminum trifluoride is an extremely stable, ionic compound, and is substantially completely inactive for promoting acid-catalyzed reactions. Apparently, the presence of a hydroxyl group, or an oxygen bridge, on the same aluminum atom with a fluorine atom is necessary to form the acidic centers which can catalyze acid carbonium ion type reactions.

While the foregoing is largely hypothetical, it does offer a rational explanation for the substantial difficulties which have been experienced in the past with the use of fluorided or silico-fluorided alumina gel catalysts. Such catalysts may exhibit a very desirable initial activity but the activity is soon observed to decline under process conditions, even though little or no fluorine is volatilized from the catalyst and taken off with the product. Apparently, the active forms of fluorine are converted gradually, as a result of hydrolytic or disproportionation reactions, to the substantially inactive aluminum trifluoride. When this occurs, the activity of the catalyst may sometimes be restored, again temporarily, by adding more fluorine or $SiF_4$ to the catalyst. But this cannot be continued indefinitely, because soon the entire gel structure is destroyed with most of the alumina being converted to aluminum trifluoride and aluminum silicate.

The principal objective of this invention is to provide catalyst bases upon which silicon tetrafluoride may be incorporated in a form which remains active for substantially longer periods of time. Another object is to provide halogenated hydrocracking catalysts which will maintain their activity for long periods of time. Still another object is to incorporate silicon tetrafluoride into gel-type catalyst structures in such a way that the fluorine does not ultimately terminate in a non-acidic structure. Other objects will be apparent from the more detailed description which follows.

It is known that gelatinous phosphates such as aluminum phosphate are somewhat active as cracking catalysts (cf. U.S. Patent No. 2,301,913). It has now been discovered that by combining such gelatinous phosphates with silicon tetrafluoride, the cracking activity is substantially improved, and the halogen component appears to remain active for substantial periods of time. Due to the complexity of metal phosphate gel structures, it is difficult to state with certainty the chemical reacions which take place when they are treated with $SiF_4$. However, in reference to aluminum phosphate gels, the following equations illustrate what are believed to be exemplary reactions:

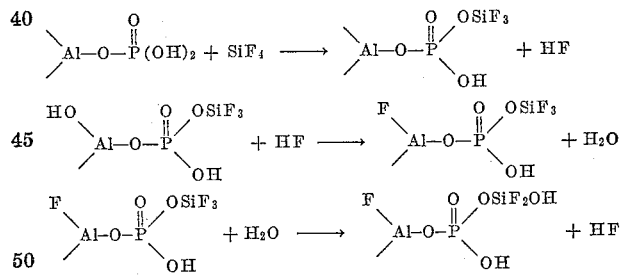

It would be expected that all of the fluorine appearing in the above structures would be highly active for promoting acid-catalyzed reactions. Moreover, due to the presence of the phosphate moiety, it is substantially impossible, under normal conditions for any significant portion of the alumina to be converted to aluminum trifluoride. These reflections may well explain the observed catalytic activity and stability of the resulting compositions, but are not intended to be limiting in their effect.

I have recently shown (copending application No. 50,857, filed August 22, 1960), that a similar activation of phosphate gels can be obtained by adding boron trifluoride thereto. However, the use of silicon tetrafluoride is found to be even more advantageous from the standpoint of stability in the presence of water, because, whereas boron trifluoride can become hydrolyzed to boric acid which is volatile, the complete hydrolysis of silicon tetrafluoride gives silica, which is nonvolatile. The net result is that the silicon tetrafluoride-treated catalysts tend to retain their activity in the presence of water for a longer period of time than the $BF_3$-treated catalysts.

Metals whose phosphates can be prepared in the form of extended gel structures include substantially any of the polyvalent metals, particularly the metals of groups IIA, IIIA, IVB and IIB. Examples of suitable phosphates include titanium phosphate, zirconium phosphate, boron phosphate, zinc phosphate, cadmium phosphate, chromium phosphate, cobalt phosphate, nickel phosphate, iron phosphate, magnesium phosphate, and of course aluminum phosphate. The gel phosphates of the metals of group VIB and group VIII already possess the desired hydrogenating function and hence may be utilized as such, or combined with other metal phosphates, or other supporting materials. For purposes of preparing active hydrocracking catalysts, the phosphates of aluminum, chromium, titanium and zirconium are preferred.

While the substantially neutral metal phosphates may be employed (i.e., those containing a stoichiometric ratio of phosphate to metal), it is contemplated that the corresponding basic phosphates or acid phosphates may also be used, so long as a xerogel structure can be obtained by controlled dehydration. While any proportion of phosphate ions added to the hydrous oxides will effect some improvement in respect to the stability of the silicon tetrafluoride treated products, it is preferred to employ metal phosphates wherein the metal/phosphorus atomic ratio falls within the range of $6/x$ to $3/2x$, $x$ being the valence of the metal. This includes both the theoretically neutral metal phosphates, the acid phosphates wherein at least half of the phosphoric acid groups are theoretically neutralized by the metal, and the basic phosphates wherein at least half of the metal hydroxide groups are theoretically neutralized by phosphoric acid.

To prepare the foregoing metal phosphates in gelatinous form, it is preferred to precipitate the same from an aqueous solution of a soluble salt of the polyvalent metal. The precipitation may be accomplished by various means, depending upon the metal, and the proportion of phosphate ions desired in the final product. The polyvalent metal phosphates are in general quite insoluble within the pH range of about 4–9, but their solubilities vary considerably at higher or lower pH ranges. To obtain precipitation therefore it is only necessary to provide in solution the desired ratio of phosphate ions at the appropriate pH range for precipitation. Where basic phosphates are desired, the final pH of precipitation will always be above about 5, and usually above 7. The pH may be adjusted upwardly by the addition of appropriate bases which forms soluble phosphates, e.g., ammonium hydroxide, sodium hydroxide, etc., or downwardly by adding appropriate acids which form soluble polyvalent metal salts, e.g., nitric acid, hydrochloric acid, etc.

In the case of aluminum phosphate gels for example, the preferred technique is to add an alkali such as ammonium hydroxide to an acidic solution of the aluminum salt plus the desired ratio of phosphate ions. Precipitation will be substantially complete within the 2–6 pH range, depending upon the ratio of aluminum salt to phosphate ions and perhaps other factors. The phosphate ions may be added as phosphoric acid, or any compatible soluble salts thereof, e.g., ammonium phosphate. Normally, it is preferable to adjust the pH of the initial solution by using phosphoric acid, but other compatible acids may be used, e.g., nitric or hydrochloric.

In the case of aluminum phosphate and other acid-soluble polyvalent metal phosphates, an especially desirable homogeneous precipitation may be obtained by the use of a delayed precipitant such as urea. In this technique, urea is added to the acidic polyvalent metal solution instead of ammonia, and the resulting solution is then heated to e.g., 50°–200° C. to effect the release of ammonia, with resultant homogeneous gelation throughout the solution. The resulting gels are found to exhibit an unusually high surface area and acidity, especially when the mole-ratio of phosphate ions to aluminum salt is between about 0.02 and 0.9. This technique is more particularly described in my copending application Serial No. 81,232, filed January 9, 1961.

Mixed metal phosphates can be readily prepared by simply using a mixture of soluble salts in the initial phosphoric acid solution. For example, where it is desired to prepare a catalyst comprising a mixture of aluminum phosphate and a hydrogenating metal phosphate such as nickel phosphate or chromium phosphate, mixtures of aluminum chloride and nickel chloride, or of aluminum chloride and chromium chloride may be coprecipitated as the hydrous phosphates by the foregoing techniques. Similarly, it is contemplated that mixtures of aluminum phosphates and zirconium phosphates may be prepared by coprecipitation from an aqueous solution of aluminum chloride and zirconium chloride, either by the addition of alkali, or a halogen acceptor such as ethylene oxide.

Following precipitation of the metal phosphate, it is ordinarily desirable to wash the hydrous gel in order to remove soluble salts, or any adhering organic compounds such as ethylene chlorohydrin. For removing the latter, it is preferred to wash with an alcohol such as ethanol or isopropanol. Ammonium salts, such as the chloride, may be removed by vaporization during calcining. Generally, the phosphate gels prepared by precipitation with an organic anion-acceptor such as ethylene oxide, or with a delayed gelling agent such as urea, display a higher surface area in their xerogel form than do the corresponding phosphates prepared by coprecipitation with bases such as ammonia. The washed gels are then preferably dried at e.g., 200° to 500° F., and then calcined at a higher temperature of e.g., 700° to 1,200° F. for 1 to 12 hours.

If it is desired to incorporate a hydrogenating component such as nickel or chromium by impregnation, this may be effected by conventional methods such as impregnating the wet or calcined phosphate gel with appropriate aqueous solutions of soluble salts such as nickel nitrate, which are then decomposed during a subsequent calcining to form either nickel oxide and/or nickel phosphates. Preferably, the calcined catalyst is then reduced with hydrogen at e.g., 500°–900° F. to convert the impregnated salt to the free metal.

The last component to be added to the catalyst is ordinarily the silicon tetrafluoride. The phosphate gels should preferably be subjected to the calcining treatment to reduce the hydroxyl water content to about 0.01–5% by weight prior to the SiF$_4$ treatment. Any amount of added SiF$_4$ will effect an improvement in the catalytic acid function of the catalyst, and hence any such amounts are contemplated. It is preferred however to add sufficient SiF$_4$ to saturate the calcined gels, and this can be controlled by simply passing SiF$_4$ over the catalyst at substantially any desired temperatures, e.g., from 0 to 800° F., and continuing such treatment until no more water is evolved, and SiF$_4$ begins to appear in the off-gases. Preferably, elevated temperatures of e.g., about 400° to 800° F. are employed during the addition of SiF$_4$ in order to assist in desorbing water formed during the reaction. If desired, an inert sweep gas such as nitrogen may be admixed with the SiF$_4$ in order to assist in the removal of water vapor. Atmospheric pressures are ordinarily employed during the SiF$_4$ addition, but either subatmospheric or superatmospheric pressures are contemplated. The final catalysts, after the SiF$_4$ treatment, will be found to have absorbed usually between about 0.1% and 20% by weight of SiF$_4$, and preferably between about 1% and 10%.

The SiF$_4$ may be added to the catalyst prior to use, or it may be added during use in the hydrocracking process by simply adding SiF$_4$ to the feed or the hydrogen. In either case, when the activity of the catalyst declines to an undesirable degree, it may be rejuvenated for substantial periods of time by intermittent or continues addition of SiF$_4$ to the feed gases.

It is also contemplated that limited amounts of water may be used along with the SiF$_4$ to maintain high activity.

The amount of water may be very low (e.g., 1–20 parts per million of the feed) or it may be as high as about 20 theoretical parts based on the reaction:

$$3SiF_4 + 2H_2O \rightarrow 2H_2SiF_6 + SiO_2$$

Thus, at 100 parts per million of $SiF_4$ in the feed, up to about 200 parts per million of water (or the equivalent amount of $CO_2$, and alcohol, etc.) may be used.

Instead of adding $SiF_4$ in the gas phase, it may also be added by impregnation in the form of an aqueous solution of fluosilicic acid, $H_2SiF_6$. Here again, it is preferred to add the fluosilicic acid to the final calcined catalyst, after addition of the hydrogenating metal, but the reverse order of addition is also contemplated. In general, aqueous impregnation with $H_2SiF_6$ gives catalysts of lower activity than the catalysts prepared by treatment with gaseous $SiF_4$, and the latter is hence preferred.

Exemplary catalysts contemplated herein include the following, the proportions being by weight:

(1) 80% $AlPO_4$, 10% $MoO_3$, 3% $CoO$, 7% $SiF_4$
(2) 50% $AlPO_4$, 40% $Zr_3(PO_4)_4$, 5% Ni, 5% $SiF_4$
(3) 80% $Al_2(OH)_3PO_4$, 15% Ni, 5% $SiF_4$
(4) 80% $Al(PO_4)PO(OH)_3$, 15% Ni, 5% $SiF_4$
(5) 85% $Ti_3(PO_4)_4$, 10% Ni, 5% $SiF_4$
(6) 60% $AlPO_4$, 30% $CrPO_4$, 10% $SiF_4$
(7) 60% $AlPO_4$, 35% $Fe_3(PO_4)_2$, 5% $SiF_4$
(8) 50% $AlPO_4$, 45% $Co_3(PO_4)_2$, 5% $SiF_4$
(9) 40% $Zr_3(PO_4)_4$, 40% $Ti_3(PO_4)_4$, 15% Ni, 5% $SiF_4$

Many other catalysst of a similar nature can also be utilized.

The catalysts of this invention may be employed for the hydrocracking of substantially any mineral oil fraction boiling above the conventional gasoline range, i.e., above about 300° F., and usually above about 400° F., and having an end-boiling point up to about 1,000° F., but preferably not greater than about 850° F. These feedstocks may be sulfur-free, or they may contain up to about 5% by weight of sulfur, in the from of organic sulfur compounds. If it is desired to maintain the catalyst in a completely sulfided state, feedstocks containing between about 0.01% and 5% by weight of sulfur may be used, or a small proportion of $H_2S$ may be recirculated in the recycle gas. Specific feedstocks contemplated comprise straight-run gas oils and heavy naphthas, coker distillate gas oils and heavy naphthas, deasphalted crude oils, cycle oils derived from catalytic or thermal cracking operations, and the like. These feedstocks may be derived from petroleum crude oils, shale oils, tar sand oils, coal hydrogenation and the like. Specifically, it is preferred to employ oils having an API gravity between about 20° and 35°, and containing at least about 30% by volume of acid soluble components (aromatics plus olefins).

Hydrocracking conditions to be employed herein fall within the following ranges:

Table 1

| | Operative | Preferred |
|---|---|---|
| Temperatute, ° F | 400–800 | 450–700 |
| Pressure, p.s.i.g | 500–5,000 | 750–2,500 |
| H₂/oil ratio, s.c.f./bbl | 1,000–15,000 | 2,000–10,000 |
| LHSV | 0.1–10 | 0.5–5 |

The lower temperature ranges from about 400° to 600° F. are normally desirable for the treatment of high-boiling feedstocks, for example those having an end-point above about 700° F. Those skilled in the art will understand that the combination of conditions selected should be correlated with the particular feedstock and catalyst used, to obtain the desired conversion per pass, normally between about 20% and 70% by volume of the fed. Ordinarily, about 500 to 3,000 s.c.f. of hydrogen per barrel of gasoline produced is consumed during the hydrocracking. "Conversion" is measured in terms of volumes of original feed converted per volume of feed processed, times 100.

The catalysts of this invention may also be employed for other acid-catalyzed reactions, e.g., hydroisomerization, alkylation, dealkylation, disproportionation, polymerization, carbonylation, etc.

The following examples are cited to illustrate the invention and the results obtainable, but are not to be construed as limiting in scope:

EXAMPLE I

NON-FLUORINATED CATALYSTS

A. A catalyst base comprising about 50% by weight of $AlPO_4$ and 50% of $Al_2O_3$ was prepared by homogeneous precipitation of the hydrous cogel from an aqueous solution of aluminum nitrate and phosphoric acid by hydrolysis of added urea at 80°–100° C. The resulting gel was dried at 500° F. to decompose the ammonium nitrate and excess urea, then pelleted and calcined at 600° C. for 16 hours. The calcined pellets were impregnated with aqueous nickel nitrate solution to give about 10% metallic nickel on a dry basis, then calcined and reduced in hydrogen. The resulting catalyst was tested for hydrocracking of a hydrogenated gas oil having the following properties:

| | |
|---|---|
| Gravity, ° API | 39.2 |
| Boiling range, ° F. (Engler) | 436–536 |
| Nitrogen, wt. percent | 0.0001 |
| Acid solubility, vol percent | 18 |

Conditions of the test runs were as follows:

| | |
|---|---|
| Pressure, p.s.i.g. | 1,000 |
| Temperature, ° F | 650 and 700 |
| LHSV | 2.0 |
| H₂/oil, s.c.f./bbl | 10,000 |

The catalyst was presulfided with feed containing 10% sulfur (as thiophene) and tested with 0.1% sulfur added to the above feed.

Essentially zero conversion was obtained at the 650° and 700° F. temperature levels, thus demonstrating that the catalyst without added $SiF_4$ is essentially inactive for hydrocracking at low temperatures.

B. Another catalyst base containing 75% $AlPO_4$ and 25% $Al_2O_3$ was prepared in the same manner and impregnated with the same amount of nickel. Tested under the same conditions (700° F.), this catalyst was also completely inactive.

EXAMPLE II $SiF_4$-TREATED CATALYSTS

A catalyst having the same composition as that of Example I–B was pretreated with 35 cubic feet of a gas mixture comprising 0.06 mole-percent of $SiF_4$ and 99.94 mole-percent of nitrogen. The pretreatment was carried out at 625° F. over a period of about 4 hours after reduction of the catalyst with hydrogen for 6 hours at 700° F. Both reduction and pretreatment were at atmospheric pressure. The quantity of $SiF_4$ passed over the catalyst corresponded approximately to 1.3 weight-percent of fluorine based on the dry catalyst.

The pretreated catalyst was tested at 625° F. and 1,500 p.s.i.g., using as feed a 738° F. end-point hydrogenated gas oil derived from an aromatic catalytic cycle oil. Space velocity was 1.0 and the hydrogen/oil ratio was 8,000 s.c.f./bbl.

Complete (100%) conversion of the feed to light gasoline boiling below 270° F. was obtained in a single pass through the $SiF_4$-pretreated catalyst. This startling result clearly demonstrates the very high degree of activity resulting from the addition of very small amounts of $SiF_4$ to $AlPO_4 \cdot Al_2O_3$ catalysts. A 50–60% conversion to 400° F. end-point gasoline would be obtained at temperatures as low as 500° F.

When other hydrocracking catalysts within the purview of this invention are substituted in the foregoing example, generally similar results are obtained, with respect to the effect of silicon tetrafluoride upon catalyst activity. It is therefore not intended that the invention should be limited to the details described above since many variations may be made by those skilled in the art without departing from the scope or spirit of the following claims.

I claim:

1. A process for hydrocracking a high-boiling mineral oil feedstock to produce therefrom lower boiling hydrocarbons, which comprises contacting said feedstock in the presence of added hydrogen and under hydrocracking conditions including a temperature between about 400° and 800° F., with a hydrocracking catalyst comprising (1) a polyvalent metal phosphate in xerogel form; (2) a transitional metal hydrogenation component, and (3) silicon tetrafluoride combined with said metal phosphate xerogel, and recovering low-boiling hydrocarbons from said contacting, the metal of said polyvalent metal phosphate being selected from the class consisting of the metals of groups IIA, IIIA, IVB and IIB of the periodic table.

2. A process as defined in claim 1 wherein the metal/phosphorus atomic ratio in said metal phosphate falls within the range of about $6/x$ to $3/2x$, $x$ being the valence of said metal.

3. A process as defined in claim 2 wherein said polyvalent metal is aluminum.

4. A process as defined in claim 1 wherein said hydrogenating component is selected from the class consisting of the group VIB and group VIII metals, and the phosphates, sulfides and oxides thereof.

5. A process as defined in claim 1 wherein said catalyst is prepared by co-gelling the mixed phosphates of (1) a metal from the class consisting of aluminum, chromium, zirconium and titanium, and (2) a group VIII metal, then drying and calcining the mixed gel at a temperature between about 700° and 1,200° F. for 1 to 12 hours, and then treating the calcined gel with silicon tetrafluoride.

6. A process as defined in claim 1 wherein said polyvalent metal phosphate is a basic phosphate.

7. A process for hydrocracking a mineral oil feedstock boiling above the gasoline range to produce therefrom lower boiling hydrocarbons in the gasoline range, which comprises contacting said feedstock in the presence of added hydrogen and under hydrocracking conditions including a temperature between about 400° and 800° F., with a hydrocracking catalyst comprising (1) a xerogel phosphate of at least one metal from the class consisting of aluminum, chromium, zirconium and titanium; (2) an impregnated group VIII metal hydrogenation component, and (3) added silicon tetrafluoride in chemical combination with said component (1), and recovering gasoline-boiling-range hydrocarbons from said contacting.

8. A process as defined in claim 7 wherein the metal/phosphorus atomic ratio in said metal phosphate falls within the range of about $6/x$ to $3/2x$, $x$ being the valence of said metal.

9. A process as defined in claim 8 wherein said metal phosphate is aluminum phosphate, and said hydrogenating component is selected from the class consisting of nickel metal and compounds thereof.

10. A catalyst composition having active acidity and hydrogenation activity, said catalyst comprising as the essential active components (1) a polyvalent metal phosphate in xerogel form; (2) a transitional metal hydrogenating component and (3) silicon tetrafluorodie combined with said metal phosphate xerogel, the metal of said polyvalent metal phosphate being selected from the class consisting of the metals of groups IIA, IIIA, IVB and IIB of the periodic table.

11. A composition as defined in claim 10 wherein the metal/phosphorus atomic ration in said metal phosphate falls within the range of about $6/x$ to $3/2x$, $x$ being the valence of said metal.

12. A composition as defined in claim 10 wherein said hydrogenating component is selected from the class consisting of the group VIB and group VIII metals, and the phosphates, sulfides and oxides thereof.

13. A composition as defined in claim 10 wherein said polyvalent metal is aluminum, and said hydrogenating component is selected from the class consisting of nickel metal and compounds thereof.

14. A composition as defined in claim 9 wherein said polyvalent metal phosphate is a basic aluminum phosphate.

References Cited in the file of this patent

UNITED STATES PATENTS

| | | |
|---|---|---|
| 2,301,913 | Veltman | Nov. 17, 1942 |
| 2,425,463 | Garrison | Aug. 12, 1947 |
| 2,450,316 | Voorhies et al. | Sept. 28, 1948 |
| 2,863,824 | Grosse et al. | Dec. 9, 1958 |